Dec. 12, 1939.   V. H. HURT   2,183,380

LAMINATED SHEET MATERIAL AND ARTICLE MADE THEREFROM

Filed Aug. 5, 1936

INVENTOR
VICTOR H. HURT
BY
ATTORNEY

Patented Dec. 12, 1939

2,183,380

UNITED STATES PATENT OFFICE 2,183,380

LAMINATED SHEET MATERIAL AND ARTICLE MADE THEREFROM

Victor H. Hurt, Providence, R. I., assignor, by mesne assignments, to United States Rubber Company, New York, N. Y., a corporation of New Jersey Application August 5, 1936, Serial No. 94,358

3 Claims. (Cl. 41—21)

This invention relates to laminated sheet material and more particularly to laminated fabric and rubber sheet material and articles made therefrom.

Laminated fabric and rubber sheet material in which the fabric ply is capable of stretching to a substantial extent at least in one direction, as in the case of knitted fabrics, and in which the rubber ply is perforated, is commonly used for the manufacture of reducing girdles, corsets and the like. The elasticity of the rubber ply imparts to the laminated material the capacity to quickly retract from stretched condition and the perforations therein retain the porosity of the fabric layer to the desired extent. According to the present invention, a laminated fabric and rubber sheet material is constructed more particularly for use in bathing garment manufacture and for other uses where the material comes in contact with water. The rubber layer is used as a decorative exposed surface as well as for imparting a capacity to retract from stretched condition and for maintaining the desired porosity of the fabric layer. The fabric layer is rubberized to make the composite material resistant to the excessive absorption of an untreated fabric when exposed to water. The rubberizing of the fabric layer also permits the ready assembling of parts of an article, such as a bathing garment, by a simple cementing operation, which would be impractical with the usual laminated rubber and untreated fabric and which would, in such a case, practically necessitate a stitching operation.

The accompanying drawing illustrates one embodiment of the present invention in which—

Figure 1:
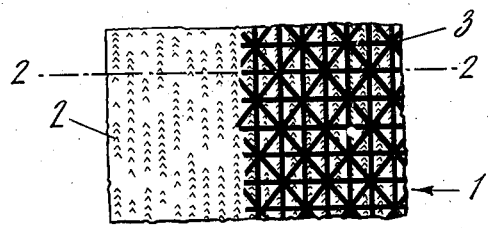
Figure 2:
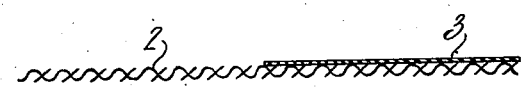
Figure 3:
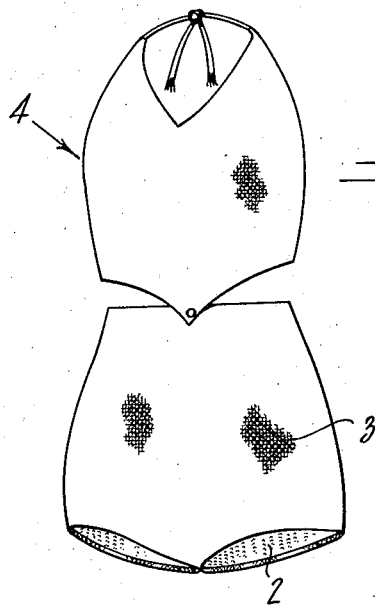

Figure 1 shows a sample of the composite material with the rubber layer partly torn away to show a complete surface of the rubberized fabric beneath, Figure 2 is an enlarged section on line 2—2 of Figure 1, and Figure 3 illustrates a bathing suit made of the material shown in Figures 1 and 2.

In carrying out the present invention, rubber sheet material having perforations in the desired design is secured to a rubberized fabric which is constructed so as to have the desired amount of stretch in any direction. The fabric, which may contain elastic threads, may be of knitted or light woven material, as is well known in the art.

The perforate rubber sheet which is to be secured to the rubberized fabric layer may be made by mechanically perforating a calendered rubber sheet in the desired design. For strength, however, in thin sheets, it is preferable to have the rubber layer of the direct deposit of solids of a latex composition. This may be done by mechanically perforating in the desired design impervious rubber sheet material made directly from latex as by a spreading operation. The perforate rubber sheet may also be made by spreading latex on to a metal backing to dry and when at least partially dried or set, impressing a patterned plate on the spread film to form perforations corresponding to raised portions on the plate. The perforate rubber sheet may also be prepared by spreading latex on a suitably engraved plate, removing latex from the relief portions of the plate by flowing or by the application of a squeegee and then allowing the latex to dry. Another method of making the perforate rubber sheet material in a wide variety of designs and simulating fabric material is disclosed in my Patent 2,032,935, granted March 3, 1936, wherein latex and a coagulant are sprayed on to an open work fabric material or a negative of such material so that the latex will deposit on the impervious portions of the fabric backing and the spray will go through the perforations in the backing thus forming a perforate rubber sheet which may be dried and removed from the backing. One embodiment of the invention wherein the perforate rubber sheet material is made according to the process of my prior Patent No. 2,032,935 will be described in detail with reference to the drawing, but such is intended to be merely illustrative of the invention since other methods than that described may be utilized for making the perforate rubber material as discussed above.

Accordingly, the desired number of perforate rubber sheets, that is, one or two depending on the type of finished article desired, and of the desired design, are made on deposition backings which are preferably made of rubberized open work fabric treated as by halogenation or oxidation to form a deposition surface from which a coagulated latex deposit may easily be removed. The backings may be rubber negatives of such open work fabrics, and in such case the rubber negatives are preferably treated as by halogenation or oxidation as above described with reference to the rubber coated fabric masters. The sheet rubber material made on these deposition backings need not have the all-over perforate designs of the backings, but the backings may have imperforate masks of fabric, paper, rubber or the like applied thereto in a desired solid design, or the perforations in desired portions of the backing may be filled over with an adhesive rubber composition or a paint to produce corresponding imperforate decorative effects in various portions of the perforate rubber sheets made on the backing. A rubber deposit of the desired gauge is built up on the deposition backing by spraying on to the backing a latex of the following composition containing the desired coloring matter and of such viscosity and at such a rate that it does not web over the perforations of the backing, and spraying a latex coagulant consisting of a 30% aqueous solution of acetic acid in alternate operations as described in my Patent 2,032,935:

| | Parts by weight |
|---|---|
| Latex solids (62% concentrate) | 100 |
| Mercaptobenzothiazole (accelerator) | .75 |
| Sulfur | 1.5 |
| Zinc oxide | 3 |
| Titanium oxide | 8 |

Final compound made to contain 55% total solids.

The latex used may be concentrated by any of the known methods such as creaming, centrifuging, evaporation or filtration. The solid and liquid materials to be added to the latex are first made into aqueous dispersions by ball milling or colloid milling with water and small amounts of dispersing agent such as gum arabic, soap or other known dispersing agents. The amount of curatives and types of accelerator may be varied as desired.

The rubberized fabric layer may be made by lightly spraying a fabric of the desired construction on both sides with a latex of the above composition. The fabric may also be rubberized by dipping into latex and blowing air through the fabric or wringing out excess latex to maintain the desired porosity. Rubber cement may be used in rubberizing the fabric as well as latex as is well known.

In making the laminated sheet material of the present invention, the perforate rubber sheet material may be adhered to one face of the rubberized fabric, in which case, the material will have one surface of fabric and the other surface of the perforate rubber layer on a fabric background. If desired, decorative rubber sheets having perforations in different designs may be secured to the opposite faces of the rubberized fabric, in which case both surfaces of the composite material will have a perforate rubber sheet in the desired design on a fabric background. Again, the perforate rubber sheet may be interposed between two layers of rubberized fabric, the perforate sheet being visible through the fabric construction.

In laminating the rubberized fabric and perforate rubber layers, the rubberized fabric, which is preferably not completely dry, is placed against the coagulated, and preferably also not completely dried, rubber deposit still on the deposition backing. Pressure is then applied to the assembled layers and the composite sheet stripped from the deposition backing with the rubber layer adhering to the fabric ply. The laminated sheet is then dried, and if desired, vulcanized. Where the composite sheet material is to be cut out to pattern and assembled, as in bathing suit manufacture, it is preferable to dry the laminated material without complete vulcanization, and to vulcanize or complete the vulcanization, after assembling. If the rubberized fabric or perforate sheet material, or both, are dried prior to laminating, it is advisable to lightly spray whichever material may have been dried with a latex cement before pressing together to insure complete bonding of the plies.

In the making of bathing garments, the laminated material is cut out to pattern and the margins of the parts joined by an adhesive, such as a solvent rubber cement or a latex cement, and the necessary reinforcements, ropes and the like, cemented. The garments after assembly are dropped over bars and vulcanized in the usual manner using dry heat or steam cure. If the composite material is completely vulcanized in the piece in the laminating operation, or is made from prevulcanized latex, the cut-out parts may be cemented at the margins with self-curing cement. If decorative perforate rubber sheets are desired on both surfaces of the rubberized fabric, the rubberized fabric with the perforate rubber sheet adhering to one surface has placed against the other surface thereof a wet perforate rubber sheet on a second backing and the two deposition backings are removed and the laminated sheet dried as above described.

Referring more particularly to the drawing, Figures 1 and 2 show a piece of the laminated sheet material 1 made as above described and having a rubberized knitted fabric layer 2 to one surface of which is secured a decorative perforate rubber layer 3, the rubber layer being shown partly broken away. A bathing suit 4 made of this material with the decorative perforate rubber layer as the exposed surface of the garment is shown in Figure 3.

Other articles such as corsets, girdles and the like may be made of the material of the present invention, and the materials may be further used as covers for stuffed cushions, or for covering porch furniture and for other outdoor uses, where the material is exposed to water in use.

Artificially prepared aqueous dispersions of rubber or rubber-like materials may be utilized in making the products of the present invention as well as natural latex, which may be preserved or compounded or otherwise treated as desired, and which may be in a normal, diluted, concentrated or purified condition produced by methods well-known in the art, and such are intended to be included within the term "latex" as used in the claims.

With the above detailed disclosure of the invention, it is evident that numerous modifications will disclose themselves to those skilled in the art and it is not desired to limit the invention otherwise than as set forth in the appended claims.

Having thus described my invention, what I claim and desire to protect by Letters Patent is:

1. A laminated sheet material comprising a stretchable rubberized fabric layer and a decorative perforate rubber sheet secured to at least one face of said fabric and forming an exposed surface of the composite material.

2. A laminated sheet material comprising a rubberized knitted fabric layer and a decorative perforate rubber sheet of the direct deposit of solids of a latex composition secured to at least one face of said fabric and forming an exposed surface of the composite material.

3. A bathing garment made of a laminated sheet material comprising a rubberized fabric layer and a decorative perforate rubber sheet secured to at least one face of said fabric and forming an exposed surface of the garment, the margins of the assembled parts of said garment being joined by an adhesive.

VICTOR H. HURT.